(No Model.)
G. C. PAYNE.
FILTER.
No. 540,819. Patented June 11, 1895.
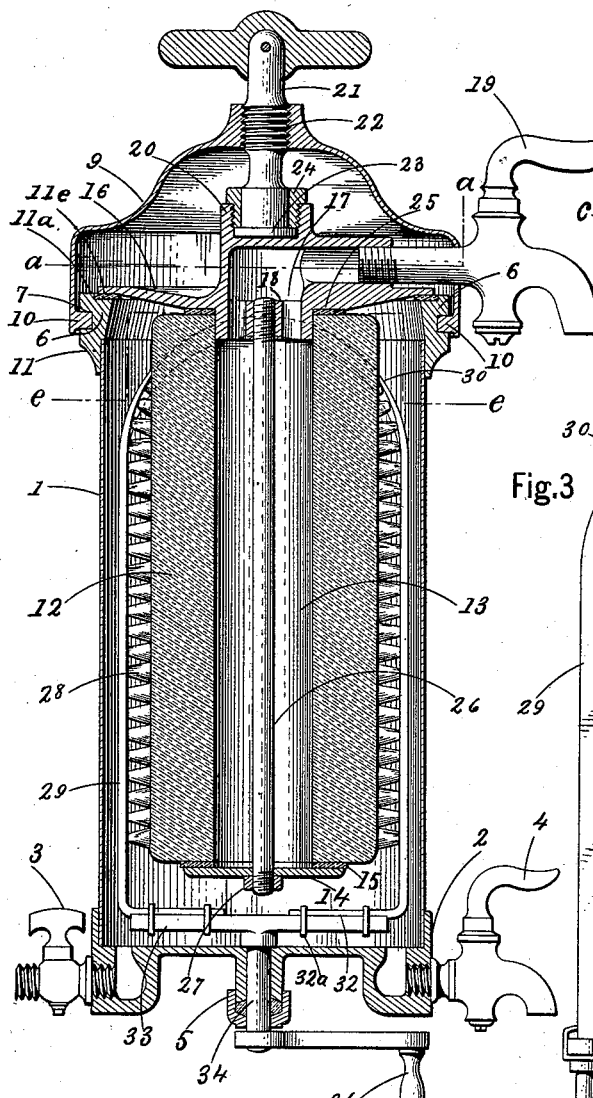
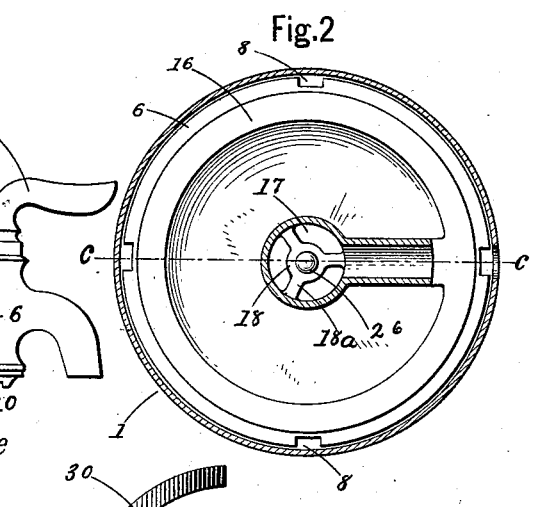
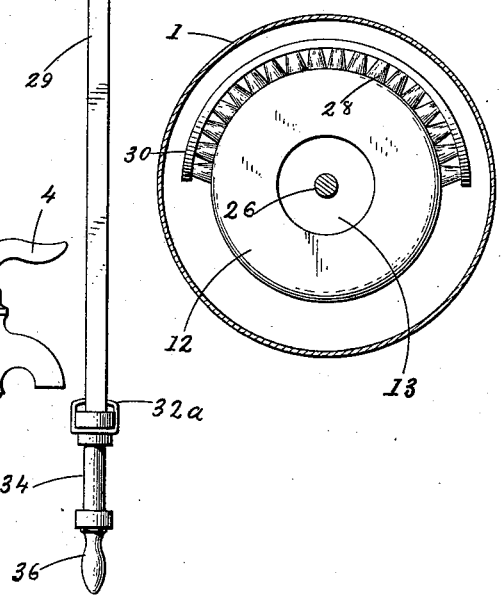
Witnesses.
A. J. Sangster
Harriet Johnson
George C. Payne, Inventor.
By James Sangster, Attorney.

United States Patent Office.

GEORGE C. PAYNE, OF BUFFALO, NEW YORK.

FILTER.

SPECIFICATION forming part of Letters Patent No. 540,819, dated June 11, 1895.

Application filed March 18, 1895. Serial No. 542,099. (No model.)

*To all whom it may concern:*

Be it known that I, GEORGE C. PAYNE, a citizen of the United States, residing at Buffalo, in the county of Erie and State of New York, have invented certain new and useful Improvements in Filters, of which the following is a specification.

My invention relates to improvements in filters for filtering water, whereby the construction of the filter is simplified, the filtering stone and the cover to which it is secured when in its normal position, are made easily removable when required, and other advantages are obtained; all of which will be fully and clearly hereinafter described and claimed, reference being had to the accompanying drawings, in which—

Figure 1 is a vertical central section on or about line $c\ c$, Fig. 2. Fig. 2 represents a horizontal section through the top of the filter on or about line $a\ a$, Fig. 1, the outlet-faucet being omitted. Fig. 3 represents a detached side elevation of the cleaning-brush. Fig. 4 is a horizontal section through the body of the filter on or about line $e\ e$, Fig. 1, showing the top of the filtering-stone and cleaning-brush.

The body 1 of the filter is preferably made of sheet metal and in a cylindrical form. It may be brass, copper, iron or other well known material and is generally nickel-plated. The bottom 2, is secured thereto by a screw portion, or by solder or in any well known way. In the bottom portion is an inlet stop-cock 3, and an outlet stop cock 4, for unfiltered water. It is also provided with a stuffing box 5, the use of which will appear farther on.

At the top of the body portion 1, is rigidly secured in any well known way a surrounding rim 6. Around the periphery of this rim is a surrounding groove 7, having in the top portion 6, of the rim a series of openings 8. (See Fig. 2.) The removable top or cover 9, of the filter is provided at its lower edge with a corresponding series of inward projecting lugs 10, (see Fig. 1) adapted to pass down into the openings 8, until stopped by the lower portion 11, of the top rim. From the above it will be seen that by now turning the cover until the lugs 10 pass the openings in the rim 6, it will be secured firmly to the filter. At the top of the rim 6, is a surrounding depression $11^a$, adapted to receive a rubber gasket $11^e$. See Fig. 1.

12, represents the filter stone. It is made cylindrical in form and is provided with a central circular opening 13, which extends down longitudinally through it. At the bottom of the filter stone is a flat disk or washer 14, having interposed between it and the stone a gasket 15, of rubber or other suitable material. At the top of the filter stone is a circular disk covering portion 16, adapted to rest on the rubber gasket $11^e$. This top portion is provided with a hollow portion 17, having a nut section 18, connected by radial arms $18^a$, so that the opening 17, extends down between the arms 18, and communicates with the central opening 13, in the filter stone. The opening 17, also extends horizontally and is adapted to receive the end of the filtered water stop cock 19, which is rigidly secured to the covering portion 16, and also passes through the cover 9, as will be seen by reference to Fig. 1. Above the hollow portion 17, is a socketed portion 20, and at the top of the cover is a hand wheel connected to a downward extending bar 21, having a screw portion 22, which fits a screw portion in the top of the cover. At the lower end of this bar 21, is a surrounding outward extending flange 23, which fits down into the socketed portion 20, so as to turn easily therein. To keep this flanged portion from coming out of the socket, a sleeve 24, is adapted to fit on the bar 21, and screw down into the socket until it just touches the top of the flange 23, sufficiently to keep it in place and allow it to turn easily. A rubber gasket 25, is also interposed between the top of the filter stone and the covering portion 16.

The covering portion 16, and disk 14, are rigidly secured to the filter stone by means of the rod 26, the top end of which screws into the nut section 18, and its lower end passes down through the washer or disk 14, where it is rigidly secured to the stone by a nut 27.

From the above described construction, it will be seen that the filter stone, the removable filter cover and the hand wheel and its several parts are, when in their normal condition, all connected together, so that when the cover is lifted off all these parts are removed together.

When the water is of such a nature that the filter will require frequent cleaning I use a brush 28. See Figs. 1, 3 and 4. This brush is formed with the two vertical side portions 29, which extend upward in the form of a semicircular portion 30, at the top. This upper curved portion extends half way around the stone substantially as shown in Figs. 1 and 4. It consists of a strip of metal bent to the form described and provided with the usual brush 28. At the bottom the side portions 29, are bent inward at 32, see Fig. 1, and fastened securely to the cross bar 33, substantially as shown at $32^a$. This cross bar 33, is provided with a central vertical shaft 34, which is in the vertical stuffing box 5. At the bottom of the shaft 34, is a handle 36, by which the brush may be turned by hand at any time from the outside of the filter when it becomes necessary to clean the filter stone.

When the filter is being thus cleaned the inlet stop cock 3, and outlet cock are opened so that the water circulates freely around the filter stone while the operation of cleaning is going on.

In many cases the brush above described, may be dispensed with as the filter stone, as hereinbefore stated, may be easily removed for cleaning.

I claim as my invention—

In a filter the combination with an outer removable cover, of a combined filter stone holder and inner cover, a rubber gasket interposed between the inner cover and the filter, and a gasket between the inner cover and the stone, means for connecting the inner cover and stone consisting of a bar extending down through the center of the stone having its lower end connected by a screw nut with a flat disk having an interposed rubber gasket to insure a tight joint between it and the stone, and its upper end connected by a screw portion, with the inner cover, an outlet stop cock passing through the outer cover and connected with the inner cover, and a passage way in the inner cover communicating with the central opening in the filter stone for conducting the filtered water to the outlet, and means substantially as above described for securing the outer cover to the filter.

GEORGE C. PAYNE.

Witnesses:
A. J. SANGSTER,
JAMES SANGSTER.